United States Patent
Maeno et al.

(10) Patent No.: US 7,232,118 B2
(45) Date of Patent: Jun. 19, 2007

(54) FLUID FILLED VIBRATION DAMPING DEVICE

(75) Inventors: Hajime Maeno, Kasugai (JP); Atsushi Muramatsu, Komaki (JP); Nobuhiro Yasumuro, Yokohama (JP); Naoki Kaneda, Kawasaki (JP); Shigeki Okai, Atsugi (JP)

(73) Assignees: Tokai Rubber Industries, Ltd., Komaki-shi (JP); Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/381,498

(22) Filed: May 3, 2006

(65) Prior Publication Data

US 2007/0001355 A1    Jan. 4, 2007

Related U.S. Application Data

(63) Continuation of application No. 10/873,605, filed on Jun. 21, 2004, now abandoned.

(30) Foreign Application Priority Data

Jun. 30, 2003    (JP)    ............................. 2003-188520

(51) Int. Cl.
    *F16M 1/00*    (2006.01)
(52) U.S. Cl. .................... 267/140.3; 267/141.1
(58) Field of Classification Search ........... 267/140.13, 267/140.1, 141.3, 140.11, 140.14, 141.1, 267/141
    See application file for complete search history.

(56) References Cited

U.S. PATENT DOCUMENTS

| | | | |
|---|---|---|---|
| 4,842,258 A | 6/1989 | Misaka et al. | |
| 5,775,666 A | 7/1998 | Tsukamoto et al. | |
| 6,352,248 B1 | 3/2002 | Hamaekers et al. | |
| 6,517,061 B2 | 2/2003 | Yamamoto et al. | |
| 6,588,737 B2 | 7/2003 | Goto et al. | |

(Continued)

FOREIGN PATENT DOCUMENTS

EP    0187188 A    6/1985

(Continued)

OTHER PUBLICATIONS

Office Action mailed Apr. 7, 2005 in U.S. Appl. No. 10/873,778.

(Continued)

*Primary Examiner*—Melanie Torres
(74) *Attorney, Agent, or Firm*—Beyer Weaver LLP

(57) ABSTRACT

A fluid filled vibration-damping device includes an elastic body disposed between a first mounting member and a second mounting member and partially defines a fluid chamber having a non-compressible fluid sealed therein, and exhibits vibration damping action on the basis of flow action of the non-compressible fluid created within the fluid chamber during vibration input. At least one mounting member from among the first and second mounting members is formed independently of the elastic body and is disposed in abutment with the elastic body in an initial load acting direction, while making the mounting member displaceable away from the rubber elastic body in a opposite direction from the initial load acting direction. A rebound stop mechanism for limiting displacement of the mounting member away from the rubber elastic body in a cushion-wise fashion is disposed between the first and second mounting members.

3 Claims, 9 Drawing Sheets

U.S. PATENT DOCUMENTS 6,631,894 B2 10/2003 Takashima et al.
6,659,436 B2 12/2003 Muramatsu et al.

FOREIGN PATENT DOCUMENTS

| FR | 2856763 | 12/2004 |
|---|---|---|
| JP | 62196433 A | 8/1987 |
| JP | 3-30736 | 5/1991 |
| JP | 05044770 A | 2/1993 |
| JP | 06294437 A | 10/1994 |
| JP | 2002-81491 | 3/2002 |

OTHER PUBLICATIONS

Preliminary Search Report mailed Jul. 6, 2005 in corresponding French application FR 0407125.

FLUID FILLED VIBRATION DAMPING DEVICE

CROSS REFERENCE TO RELATED APPLICATIONS

This application is a Continuation of pending U.S. patent application Ser. No. 10/873,605, filed on Jun. 21, 2004, now abandoned from which priority is claimed under 35 USC §120 and which is incorporated herein by reference in its entirety. The disclosure of Japanese Patent Application No. 2003-188520 filed on Jun. 30, 2003 including the specification, drawings and abstract is incorporated herein by reference in its entirety.

BACKGROUND OF THE INVENTION

1. Field of the Invention

The present invention pertains to a fluid filled vibration damping device that exhibits vibration damping effect on the basis of flow action of a non-compressible fluid sealed therein, and in particular relates to a fluid filled vibration damping device suitable for use in an automotive engine mount, body mount, or cab mount, for example.

2. Description of the Related Art

There have been widely used in a variety of fields vibration damping devices each having a rubber elastic body disposed between first and second mounting members fixable to components connected together in vibration isolating fashion. As one type of such vibration damping devices, there is known a fluid filled vibration damping device in which the rubber elastic body partially defines a fluid chambers filled with a non-compressible fluid sealed therein. JP-A-2002-81491 and JP-B-3-30736 disclose examples of such a fluid-filled vibration damping devices.

The fluid-filled vibration damping device of this construction is capable of exhibiting vibration damping effect on the basis of resonance or other flow actions of the non-compressible fluid created within the fluid chamber in association with elastic deformation of the rubber elastic body during input of vibration, thereby readily affording low dynamic spring action and high attenuating action in the tuning frequency range at levels not achieved simply by damping action of a rubber elastic body. For this advantage, the fluid-filled vibration-damping device has been studied to apply to automotive vibration damping devices in which high levels of damping performance are required in certain specific frequency ranges.

Extensive researches conducted by the inventors has revealed that the fluid filled vibration damping devices of conventional design may possibly suffer from deterioration in the damping performance, when a relatively large load is input to the rubber elastic body in the opposite direction (rebound direction) from the direction in which initial load is exerted (bound direction) due to the distributed support load of a power unit, that is, in the direction that expands the volume of the fluid chamber.

Namely, in the conventional fluid-filled vibration damping device, is sealed a non-compressible fluid within the fluid chamber whose wall is partially defined by the rubber elastic body. Therefore, when a relatively large load is input in the opposite direction from the direction in which initial load is exerted on the rubber elastic body, the sealed fluid undesirably exerts constraining force on the rubber elastic body in a direction tending to inhibit elastic deformation of the elastic body. This creates a rubber elastic body dynamic spring constant that is greater than that of a rubber elastic body alone, resulting in deterioration in damping performance.

In the case of a mounted type fluid-filled vibration damping device of a design wherein negative pressure is generated within the fluid chamber in the event of a large load input in opposition to the rebound direction, there are a risk that the resultant large negative pressure created within the fluid chamber will result in separation and bubble formation of air component contained in the sealed fluid, and a risk of problems with noise and shock as bubbles form and disappear. Further, air bubbles formed within the fluid chamber due to separation of air component present in the fluid can also undergo compression during vibration input, leading to insufficient increase in the interior pressure of the fluid chamber. As a result, there is likelihood that the mounted-type fluid-filled vibration-damping device fails to provide a desired level of damping performance during vibration input.

SUMMARY OF THE INVENTION

It is therefore one object of this invention to provide a fluid-filled vibration-damping device, which is novel in construction, and which is capable of moderating deterioration in damping performance thereof during input of high load in the direction opposite from the initial load input direction.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a fluid filled vibration damping device comprising: a first mounting member; a second mounting member; a rubber elastic body disposed between the first and second mounting members; and a fluid chamber whose wall is partially defined by the rubber elastic body, and having a non-compressible fluid sealed therein, wherein initial road and vibration are caused to act on the rubber elastic body by means of the first and second mounting member, so as to produce vibration damping action on the basis of flow action of the non-compressible fluid created within the fluid chamber during vibration input, and wherein at least one mounting member from among the first mounting member and the second mounting member is formed independently of the rubber elastic body and is disposed in abutment with the rubber elastic body in an initial load acting direction, while making the one mounting member displaceable away from the rubber elastic body in a opposite direction from the initial load acting direction, and a rebound stop mechanism for limiting an amount of displacement of one mounting member away from the rubber elastic body in a cushion-wise fashion is disposed between the first mounting member and the second mounting member.

In the fluid-filled vibration damping device of construction according to this mode, at least one mounting member from among the first mounting member and the second mounting member is formed independently of the rubber elastic body between the first mounting member and the second mounting member, and is moreover disposed in abutment with the rubber elastic body in the initial load acting direction. Additionally, this mounting member formed independently of the rubber elastic body is displaceable away from the rubber elastic body in the direction opposite the initial load acting direction. Therefore, when a relatively large load is input in the direction opposite the initial load acting direction, the mounting member formed independently of the rubber elastic body is caused to undergo displacement away from the rubber elastic body, whereby tensile elastic deformation of the rubber elastic body in the direction opposite the initial load acting direction may be avoided.

Therefore, when a relatively large load is input to the rubber elastic body in the direction opposite the initial load acting direction, the fluid-filled damping device of construction according to this mode is capable of avoiding creation of tensile elastic deformation in the rubber elastic body, thereby making it possible to ensure the durability of the rubber elastic body, and in particular durability of the rubber elastic body in the load input direction as well as inhibiting deterioration in vibration damping performance due to high levels of tensile elastic deformation of the rubber elastic body by the load input.

Further, the fluid-filled vibration damping device of this mode is capable of avoiding the phenomenon whereby the non-compressible fluid sealed within the fluid chamber partially defined by the rubber elastic body functions as a restricting member that restricts elastic deformation of the rubber elastic body. This makes it possible to avoid an increase in the dynamic spring constant of the rubber elastic body, and resultant deterioration in damping performance.

When the principle of the invention is applied to a mounted type fluid-filled vibration damping device wherein negative pressure is generated within the fluid chamber in the event of a relatively large load input in opposition to the rebound direction, the fluid-filled vibration damping device is free from the conventionally experienced problem that the negative pressure generated within the fluid chamber causes dissolved air present in the non-compressible fluid to separate and form air bubbles. Thus, it is possible to avoid the resultant noise and shock as the air bubbles form and disappear. Additionally, it is also possible to avoid a risk that the desired level of damping performance during vibration input will not be achieved, due to compression of the air bubbles during vibration input and consequent failure of the internal pressure of the fluid chamber to increase.

Still further, since is disposed between the first mounting member and the second mounting member the rebound stop mechanism providing buffered limitation of the mount of displacement away from the rubber elastic body by the mounting member formed independently of the rubber elastic body, collision of the mounting member formed independently of the rubber elastic body with the power unit or other component may be avoided.

With this mode, meant by "initial load" is, for example, the distributed support load of power unit etc., where the components linked by the fluid filled vibration damping device in a vibration isolating manner are the power unit and the body of the vehicle.

The rebound stop mechanism in this mode may be effectively embodied, for example, by providing a cushioning part formed of rubber material or the like to the first or second mounting member formed independently of the rubber elastic body, as well as providing a stop member disposed in opposition to the cushioning part in the direction opposite from the initial load acting direction such that the stop member is brought into abutment with the cushioning part when the first or second mounting member formed independently of the rubber elastic body undergoes displacement in the direction opposite from the initial load acting direction.

A second mode of the invention is a fluid-filled vibration damping device according to the first mode, wherein the second mounting member is fixed to the rubber elastic body, and the first mounting member is formed independently of the rubber elastic body, while the rebound stop mechanism includes a rebound stop rubber being fixed to the first mounting member. In the fluid-filled vibration damping device of construction according to this mode, since the first mounting member is formed independently of the rubber elastic body, and a rebound stop rubber constituting the rebound stop mechanism is fixed to the first mounting member, it is possible to fabricate the rubber elastic body and rebound stop rubber as separate components. This arrangement makes it possible to form the rubber elastic body and the rebound stop rubber of different materials having different characteristics. By way of specific example, the rubber elastic body may be formed of a material exhibiting durability with respect to the non-compressible fluid sealed within the fluid chamber, while the rebound stop rubber may be formed of another material that is not durable with respect to the non-compressible fluid.

BRIEF DESCRIPTION OF THE DRAWINGS

The forgoing and/or optional objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
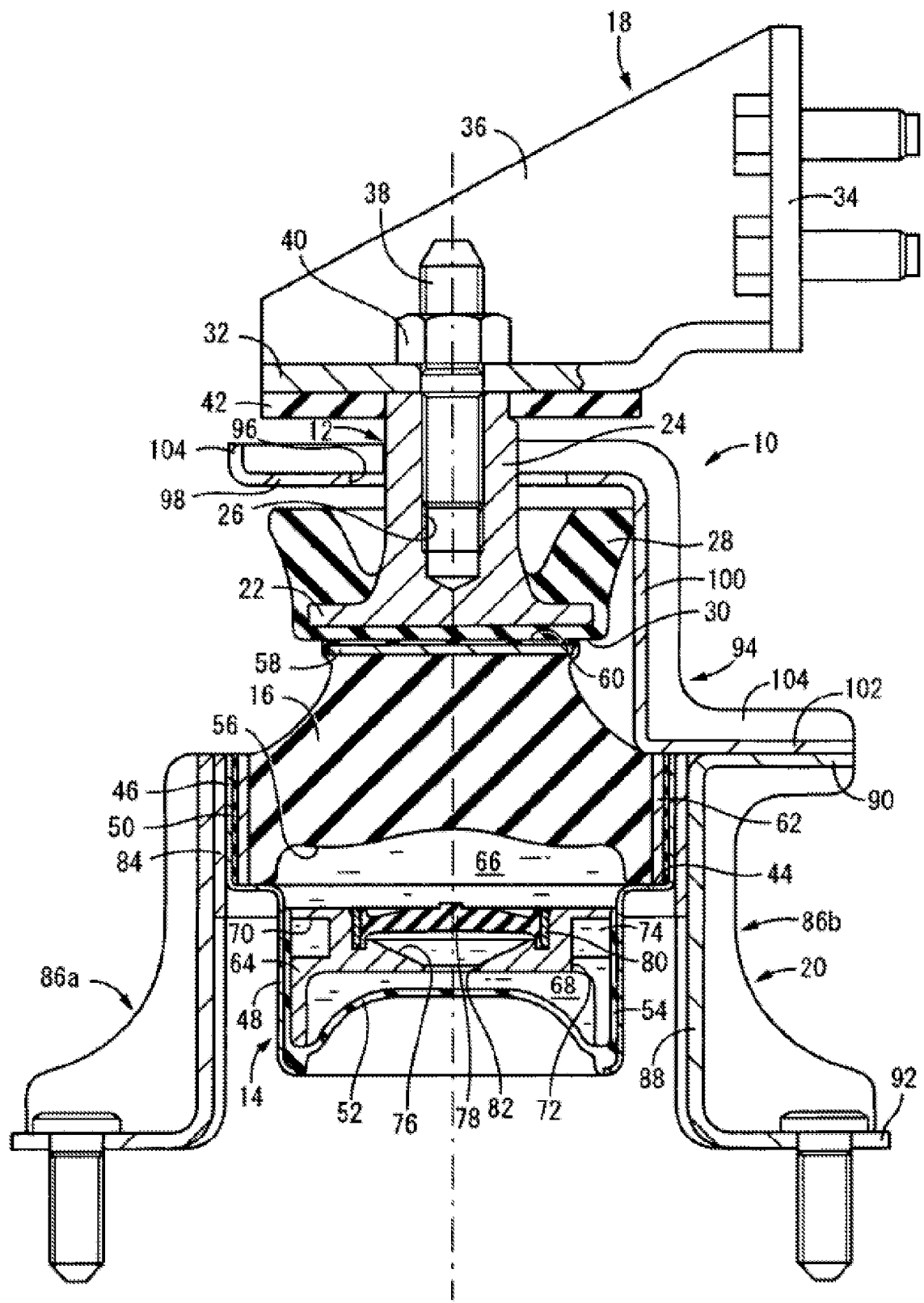
FIG. 1 is an elevational view in axial or vertical cross section of a fluid-filled vibration damping device in the form of an engine mount of construction according to a first embodiment of the invention, which is a view taken along line 1-1 of FIG. 2.

Referring first to FIG. 1, there is shown a fluid-filled vibration-damping device in the form of an engine mount 10 for automotive vehicles, which is constructed according to a first embodiment of the invention. The engine mount 10 has a structure comprising a rubber elastic body 16 disposed between a metallic first mounting member 12 fixable to a power unit (not shown), and a metallic second mounting member 14 fixable to a body of the vehicle (not shown). The first mounting member 12 is fixed via a power unit-side bracket 18 to the power unit, while the second mounting member 14 is fixed via a body-side bracket 20 to the body, so that the power unit is mounted on the body in vibration-damping fashion. With the engine mount 10 of this embodiment installed in this state, the engine mount 10 bears a distributed support load of the power unit or static load exerted thereon in the generally vertical direction in FIG. 1, and exhibits effective damping action against vibration applied thereto in the generally vertical direction in FIG. 1.

More specifically, the first mounting member 12 includes a disk-shaped first abutting portion 22 and a fastener portion 24 of rod shape integrally formed with and projecting upward in the axial direction (upward in FIG. 1) from the disk-shaped first abutting portion 22. The fastener portion 24 is provided with a tapped hole 26 open in the axially upper face thereof. To the upper face of the first abutting portion 22, a cushion rubber 28 is bonded through vulcanization of a rubber material for forming thereof at a location where the fastener portion 24 is not disposed, that is, at the outer peripheral edge portion of the upper face of the first abutting portion 22, thereby providing a rebound stop rubber that projects upward in the axial direction. This cushion rubber 28 provided as the rebound stop rubber is formed with a generally uniform cross sectional shape all the way around the circumference, giving it a thick annular configuration overall. In this embodiment, the cushion rubber 28 has an inside diameter dimension and outside diameter dimension that increase gradually moving upwardly in the axial direction. The cushion rubber 28 also extends to the lower face of the first abutting portion 22, so that the lower face of the first abutting portion 22 is covered entirely by the extended portion of the cushion rubber 28. As a result, there is formed in the axially lower portion of the first mounting member 12 an abutting face 30 composed of the portion of the cushion rubber 28 that extends over the lower face of the first abutting portion 22, and somewhat larger than the lower face of the first abutting portion 22 as well as being flat.

The first mounting member 12 having the above construction is attached to the power unit via power unit-side bracket 18. This power unit-side bracket 18 is made of steel or other rigid material, and includes a first mounting plate 32 for attachment of the first mounting member 12, and a second mounting plate 34 for attachment of the power unit. A reinforcing rib 36 is disposed between the first mounting plate 32 and second mounting plate 34. With the distal end face of the fastener portion 24 superimposed against the lower face of the first mounting plate 32 of the power unit-side bracket 18, a bolt 38 is threaded into the tapped hole 26, and a nut 40 is threaded onto the bolt 38 to fix the first mounting member 12 onto the power unit-side bracket 18. By then bolting the power unit-side bracket 18 onto the power unit with the first mounting member 12 fixed thereto in this manner, the first mounting member 12 is secured to the power unit via the power unit-side bracket 18. To the lower face of the first mounting plate 32 is adhered an abutting rubber 42 of disk shape, so as to surround the fastener portion 24 that has been fixed to the first mounting plate 32.

The second mounting member 14, on the other hand, has an overall shape which is a large-diameter cylinder, having a shoulder portion 44 formed in the axially medial portion that is interposed between a large-diameter portion 46 situated axially above and a small-diameter portion 48 situated axially below. A thin seal rubber layer 50 is adhered to the inner circumferential surface of the large-diameter portion 46, and a diaphragm 52 constructed of rubber film of thin disk shape is disposed at the open-end portion of the small-diameter portion 48. The diaphragm 52 is bonded at its outside peripheral edge to the inner circumferential surface of the small-diameter portion 48 through vulcanization of a rubber material for forming thereof, whereby the open-end portion of the small-diameter portion 48 is provided with fluid-tight closure by the diaphragm 52. To the inner circumferential surface of the small-diameter portion 48 is adhered a seal rubber 54 integrally formed with the diaphragm 52 in its entirety.

The first mounting member 12 is disposed spaced away from the open end portion of the large-diameter portion 46, in a substantially concentric fashion. The rubber elastic body 16 is disposed between the first and second mounting members 12, 14.

This rubber elastic body 16 is of generally frustoconical shape overall, having at the large-diameter end face thereof a recess 56 that opens axially downward, and at the small-diameter end face thereof a support plate 58 of disk shape. In this embodiment, the rubber elastic body 16, which is bonded through the vulcanization to the lower face of the support plate 58, extends to the upper face of the support plate 58, whereby the entire upper face of the support plate 58 is covered by the portion extending from the rubber elastic body 16. As a result, there is formed at the small-diameter end of the rubber elastic body 16 an abutting face 60 composed of the portion of the rubber elastic body 16 that extends over the upper face of the support plate 58, and larger than the lower face of the support plate 58 as well as being flat. In this embodiment, the abutting face 60 on the side of the rubber elastic body 16 is smaller than the abutting face 30 on the side of the first mounting member 12 and is reinforced by the support plate 58 so that the rubber elastic body 16 exhibits shape stability at a location where the first mounting member 12 is superimposed against the rubber elastic body 16. A connector fitting 62 of cylindrical shape is bonded to the outer circumferential surface of the large-diameter end portion of the rubber elastic body 16 through the vulcanization.

The connector fitting 62 is inserted into the large-diameter portion 46 of the second mounting member 13, and the large-diameter portion 46 then subjected to a drawing operation or the like to be downsized in its diametric direction, whereby the connector fitting 62 is secured press-fit into the second mounting member 14. With this arrangement, the opening on the side of the large-diameter portion 46 of the second mounting member 14 is provided with a fluid-tight closure by means of the rubber elastic body 16, thereby providing a fluid sealing region inside the second mounting member 62.

Within the small-diameter portion 48 of the second mounting member 14, disposed is a partition member 64 housed therein. This partition member 64 has a round block shape overall, and is secured press-fit against the inner circumferential surface of the small-diameter portion 48 in a fluid-tight fashion. Secure fitting of the partition member 64 against the small-diameter portion 48 is advantageously achieved by means of subjecting the small-diameter portion 48 to the drawing operation or the like.

By situating the partition member 64 in the described manner, the fluid sealing region formed within the second mounting member 14 is partitioned into two sides in the axial direction (the rubber elastic body 16 side and the diaphragm 52 side). With this arrangement, there is formed on the axially upper side of the partition member 64 a pressure receiving chamber 66 a portion of whose wall is partially constituted by the rubber elastic body 16, so as to undergo change in internal pressure on the basis of elastic deformation of the rubber elastic body 64 during vibration input. On the axially lower side of the partition member 64, on the other hand, there is formed an equilibrium chamber 68 a portion of whose wall is constituted by the diaphragm 80, and that readily permits change in volume based on elastic deformation of the diaphragm 52. Within the pressure receiving chamber 66 and the equilibrium chamber 68 is respectively sealed a non-compressible fluid such as water, alkylene glycol, polyalkylene glycol, silicone oil or the like.

The partition member 64 is formed with a recessed groove 70 open in its outer circumferential surface, and extends in its circumferential direction. By covering the outer peripheral opening of the recessed groove 70 with the small-diameter portion 48 of the second mounting member 14, there is formed an orifice passage 74 that extends a predetermined distance in the circumferential direction. One of circumferential opposite ends of the orifice passage 74 is held in fluid communication with the pressure-receiving chamber 66 through a communication hole (not shown), and the other end of the orifice passage 74 is held in fluid communication with the equilibrium chamber 68 through communication hole 72, thereby permitting fluid to flow between the pressure-receiving chamber 66 and the equilibrium chamber 68. In this embodiment, the passage length, sectional area and other parameters of the orifice passage 74 are suitably determined so that effective vibration damping action against low frequency vibration, such as shake or idling vibration, is exhibited on the basis of resonance or flow action of the fluid caused to flow through the orifice passage 106.

The partition member 64 is formed with a center hollow 76 that opens in its upper face, and a rubber elastic plate 78 is fitted into this center hollow 76. This rubber elastic plate 78 has a generally disk shape of predetermined thickness, with a fixing ring 80 bonded to its outer circumferential surface through vulcanization of a rubber material for forming thereof. This fixing ring 80 is press-fit into the center hollow 76 and secured fitted therewith, whereby the rubber elastic plate 78 is positioned extending in the axis-perpendicular direction within the center hollow 76. In this embodiment, the floor portion of the center hollow 76 has a tapered shape that gradually decreases in its diameter as it moves axially downward, whereby with the rubber elastic plate 78 installed within the center hollow 76, the lower face of the rubber elastic plate 78 is positioned above and some distance away from the floor of the center hollow 76, thereby permitting elastic deformation and/or elastic displacement of the rubber elastic plate 78.

A through hole 82 is formed in the floor portion of the center hollow 76, whereby internal pressure in the equilibrium chamber 68 and internal pressure in the pressure receiving chamber 66 are respectively exerted on the lower face and the upper face of the rubber elastic plate 78. In association with elastic deformation of the rubber elastic plate 78 on the basis of a pressure difference between the two chambers 66, 68, there is created substantial fluid flow between the pressure receiving chamber 66 and the equilibrium chamber 68 of an amount of fluid corresponding to the amount of elastic deformation of the rubber elastic plate 78. In this embodiment, when resistance to flow of the fluid through the orifice passage 74 is considerably increased during input of high frequency vibration such as booming noises, substantial fluid flow is permitted based on elastic deformation and/or elastic displacement of the rubber elastic plate 78 between the pressure receiving chamber 66 and the equilibrium chamber 68, thereby preventing or minimizing an excessive increase in the dynamic spring constant of the engine mount 10. That is, the engine mount 10 is effectively tuned so as to maintain good damping action.

The second mounting member 14 having the rubber elastic body 16 fixedly attached thereto is attached to the body via the body-side bracket 20. This body-side bracket 20 includes a plurality of (three in this embodiment) leg portions 86a, 86b, 86b secured by welding or the like to a cylindrical portion 84 extending in the axial direction with a circular cross section. The cylindrical portion 84 and the plurality of leg portions 86a, 86b, 86b are each formed of rigid material such as steel. Of the plurality of leg portions 86a, 86b, 86b, the pair of leg portions 86b, 86b are fixed in opposite to each other in the diametric direction of the cylindrical portion 84. Each of the leg portions 86b, 86b is composed of a fastening portion 88 of strip configuration that is secured to the cylindrical portion 84, and a first mounting plate 90 and a second mounting plate 92 integrally formed with the fastening portion 88 at the two lengthwise ends thereof, so as to project to one side in the thickness direction of the fastening portion 88. The fastening portion 88 is curved in the widthwise direction so that it is fixed along the outer circumferential surface of the cylindrical portion 84. Each of the pair of leg portions 86b, 86b is fixed by welding to the cylindrical portion 84, with the fastening portion 88 superimposed against the cylindrical portion 84, and with the first and second mounting plates 90, 92 projecting outward in the axis-perpendicular direction.

A stop member 42 is also attached to the body-side bracket 20. This stop member 94 is formed of rigid material such as steel, and overall is of a generally gate shape. Specifically, the stop member 94 has a pair of leg portions 100, 100 extending the generally vertical direction, integrally formed at opposite locations in the diametric direction of a ceiling plate portion 98 of annular plate configuration having a center hole 96, with the lower ends of the leg portions 100, 100 bending outwardly in the horizontal direction to form fastener plate portions 102, 102. A pair of reinforcing ribs 104, 104 are disposed on the stop member 94. The stop member 94 is fixedly attached to the body-side bracket 20 by means of welding in the place where the fastener plate portions 102, 102 are superimposed against the first mounting plates 90, 90. The method for attaching the fastener plate portions 102, 102 to the first mounting plates 90, 90 is not limited to welding. A variety of methods, such as an attachment method wherein a bolt is passed through a bolt hole formed in the fixing plate portion 102 and the first mounting plate 90, and a nut then threaded onto the bolt, and an attachment method wherein fixing plate portion 102 or the first mounting plate 90 is fastened by caulking, could be used instead.

The second mounting member 14 is fastened to the body-side bracket 20 by means of securing the large-diameter portion 46 of the second mounting member 14 press-fit into the cylindrical portion 84. The second mounting member 14 is mounted on the body via the body-side bracket 20 by means of fastening the plurality of leg portions 86a, 86b, 86b of the body-side bracket 20 to the body.

With the first mounting member 12 fastened to the power unit via the power unit-side bracket 18 and the second mounting member 14 fastened to the body via body-side bracket 20, the first mounting member 12 and the second mounting member 14 are concentrically positioned to each other.

Figure 2:
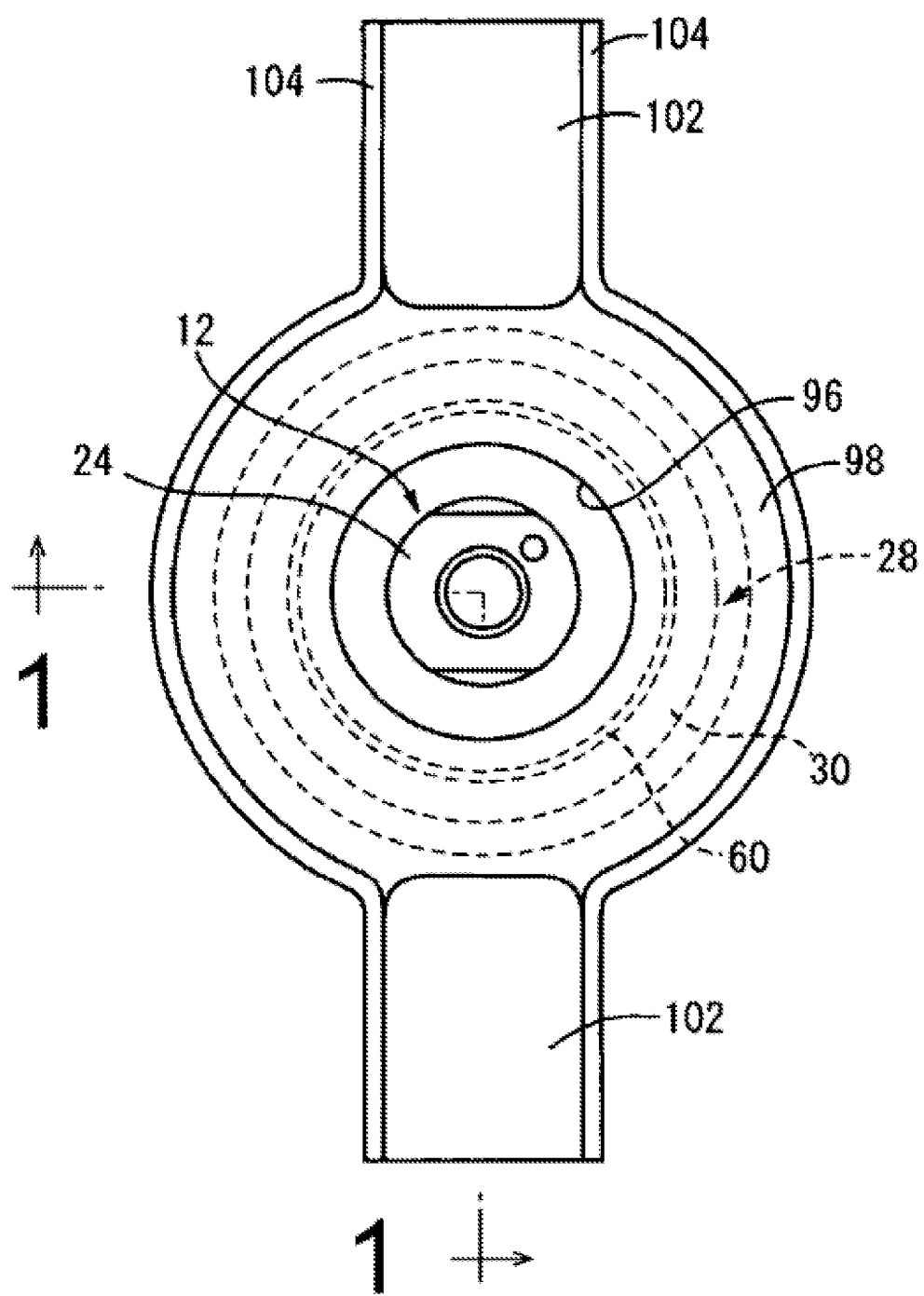
FIG. 2 is a plane view for explaining a positional relationship of a stop member fixed to a body-side bracket relative to a first mounting member in the engine mount of FIG. 1.

Also, as shown in FIG. 2, in a condition with the first mounting member 12 fastened to the power unit via the power unit-side bracket 18 and the second mounting member 14 fastened to the body via the body-side bracket 20, the fastener portion 24 of the second mounting member 12 extends through the center hole 96 of the ceiling plate portion 98 of the stop member 94 in a concentric fashion.

The abutting face 30 on the side of the first mounting member 12 is concentrically superimposed on the abutting face 60 on the side of the rubber elastic body 16, whereby the initial load, i.e., the power unit distributed support load, is exerted on the rubber elastic body 16 via the abutting face 30 of the first mounting member 12 and the abutting face 60 of the rubber elastic body 16. It should be noted that the abutting face 30 of the first mounting member. 12 is larger than the abutting face 60 of the rubber elastic body 16, in this embodiment. Therefore, if the abutting face 30 of the first mounting member 12 is not concentrically superimposed on the abutting face 60 of the rubber elastic body 16, the abutting face 30 of the first mounting member may nevertheless be made to abut the entire abutting face 60 of the rubber elastic body 16, whereby the power unit distributed support load may be exerted in a generally uniform manner on the abutting face 60 of the rubber elastic body 16. As a result, the power unit distributed support load is exerted on the rubber elastic body 16 generally in the axial direction of the second mounting member 14.

The cushion rubber 28, at a portion thereof in the circumferential direction, is held in slidably contact with the pair of leg portions 100, 100 making up the stop member 94, whereby the spring characteristics of the cushion rubber 28 are adjusted appropriately in the direction of the opposed positions of the pair of leg portions 100, 100.

An abutting rubber 42 is adhered to the power unit-side bracket 18 at a place located above a portion of the ceiling plate portion 98 of the stop member 94 where the reinforcing ribs 104, 104 are absent. Thus, the amount of displacement of the power unit-side bracket 18 and the first mounting member 12 relative to the stop member 94 and the second mounting member 14 in the bound direction (downward in FIG. 1) is limited in a cushion-wise manner.

As is understood from the preceding description, the cushion rubber 28 and the stop member 94 (in particular the ceiling plate portion 98 thereof) constitute the rebound stop mechanism, in the present embodiment. Also, in this embodiment, the fluid chamber is composed of the pressure receiving chamber 66, the equilibrium chamber 68, the orifice passage 74, and the center hollow 76.

In the engine mount 10 of the construction described above, the first mounting member 12 attached via the power unit-side bracket 18 to the power unit is not integrally formed with the rubber elastic body 16. Therefore, when a relatively large load is input in the opposite direction from the direction of the power unit distributed support load, i.e. the rebound direction, the first mounting member 12 undergoes upward axial displacement in away from the rubber elastic body 16, whereby tensile deformation of the rubber elastic body 16 in the rebound direction may be avoided, thus ensuring durability of the rubber elastic body 16, and consequently of the engine mount 10 as a whole.

In this embodiment, since axially upward tensile deformation of the rubber elastic body 16 is avoided, it is possible to avoid the phenomenon whereby the non-compressible fluid sealed within the pressure-receiving chamber 66 functions as a restricting member that restricts elastic deformation of the rubber elastic body 16.

Further, in this embodiment, since axially upward tensile deformation of the rubber elastic body 16 is prevented, it is possible to avoid creation of negative pressure within the pressure receiving chamber 66, and consequent formation of air bubbles by air component present in the non-compressible fluid, and to thereby avoid the resultant noise and shock as the air bubbles form and disappear.

Still further, the engine mount 10 of this embodiment is capable of preventing or minimizing formation of air bubbles in the pressure receiving chamber 66, making it possible to avoid the conventionally experienced problem that the desired level of damping performance during vibration input will not be achieved, due to compression of air bubbles during vibrational input in the direction of the power unit distributed support load (i.e. bound direction), and consequent failure of internal pressure of the fluid chamber to rise in the pressure receiving chamber 66.

Additionally, in this embodiment, the cushion rubber 28 is held in slidably contact with the pair of leg portions 100, 100 at its upper peripheral edge portion. Therefore, when the engine mount 10 is subjected to input vibration in an axis-perpendicular direction, i.e., the direction in which the pair of leg portions 100, 100 are mutually opposed, the engine mount 10 is able to exhibit vibration damping effect with respect to input vibration in the direction of the opposed positions of the pair of leg portions 100, 100, on the basis of elastic deformation of the cushion rubber 28.

Also, with the help of the cushion rubber 28 held in slidably contact with the pair of leg portions 100, 100, the superimposed location of the first mounting member 12 relative to the rubber elastic body 16 may be positioned elastically.

According to this embodiment, with the first mounting member 12 superimposed on the rubber elastic body 16 displaceably away therefrom, the fastener portion 24 of the first mounting member 12 is inserted into the center hole 96. Therefore, the movement of the first mounting member 12 in the axis-perpendicular direction is restricted by the outer peripheral face of the fastener portion 24 coming into abutment with the inner circumferential surface of the center hole 96, so that the first mounting member 12 can be maintained in an assembled state superimposed against the rubber elastic body 16.

Still further, since the face of the power unit-side bracket 18 against which the fastener portion 24 is superposed is covered by the abutting rubber 42, impact between the power unit-side bracket 18 and the ceiling plate portion 98 of the stop member 94 can be restricted in a cushion-wise manner, thus preventing noise during impact.

Figure 3:
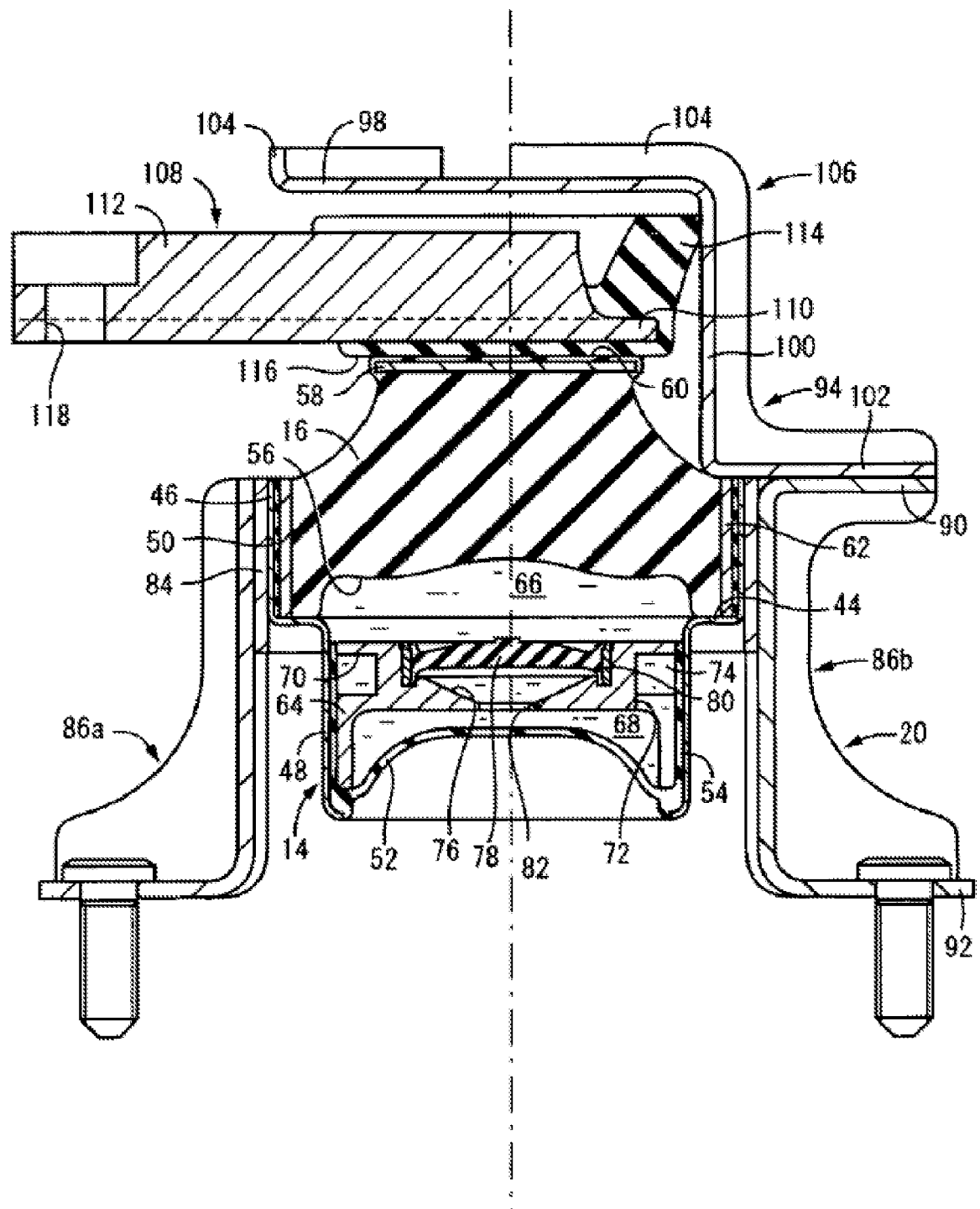
FIG. 3 is an elevational view in axial or vertical cross section of a fluid-filled vibration damping device in the form of an engine mount of construction according to a second embodiment of the invention, which is a view taken along line 3-3 of FIG. 4.

FIG. 3 illustrates a fluid-filled vibration damping device in the form of an automotive engine mount 106. In the following description, the same numerals will be used to identify the structurally or functionally identical or corresponding elements, and redundant description of these elements will not be provided, in the interest of brevity and simplification of the description.

More specifically, the engine mount 106 of this embodiment differs from the engine mount (10) of the first embodiment in that it lacks a power unit-side bracket (18), and has a first mounting member 108 of different structure. Also, there is no center hole (96) in the ceiling plate portion 98 of the stop member 94.

The first mounting member 108 includes an abutting plate 110 of long plate shape and a projection 112 of long block shape integrally formed with the upper face of the abutting plate 110. First lengthwise end faces of the abutting plate 110 and the projection 112 are coplanar with each other, while second lengthwise end faces of the abutting plate 110 and the projection 112 are not coplanar, but instead bow in arcuate configuration.

An upwardly projecting cushion rubber 114 is bonded through vulcanization of the rubber material for forming thereof to the second lengthwise end of the abutting plate 110. This cushion rubber 114 is formed extending with a generally unchanging cross sectional shape along the outer peripheral face of the second lengthwise end of the abutting plate 110, and when viewed in the direction of thickness of the abutting plate 110 presents a "C" shape (see FIG. 4). The inner and outer circumferential surfaces of the cushion rubber 114 are inclined outwardly. The cushion rubber 114 extends to the lower face of the abutting plate 110, whereby the lower face of the second lengthwise end of the abutting plate 110 is covered by the portion extending out from the cushion rubber 114. As a result, there is formed on the lower face of the second lengthwise end of the first mounting member 108 an abutting face 116 composed of the portion extending out from the cushion rubber 114. In this embodiment, the abutting face 116 is flat and circular, and it is larger in terms of size than the abutting face 60 on the rubber elastic body 16.

Figure 4:
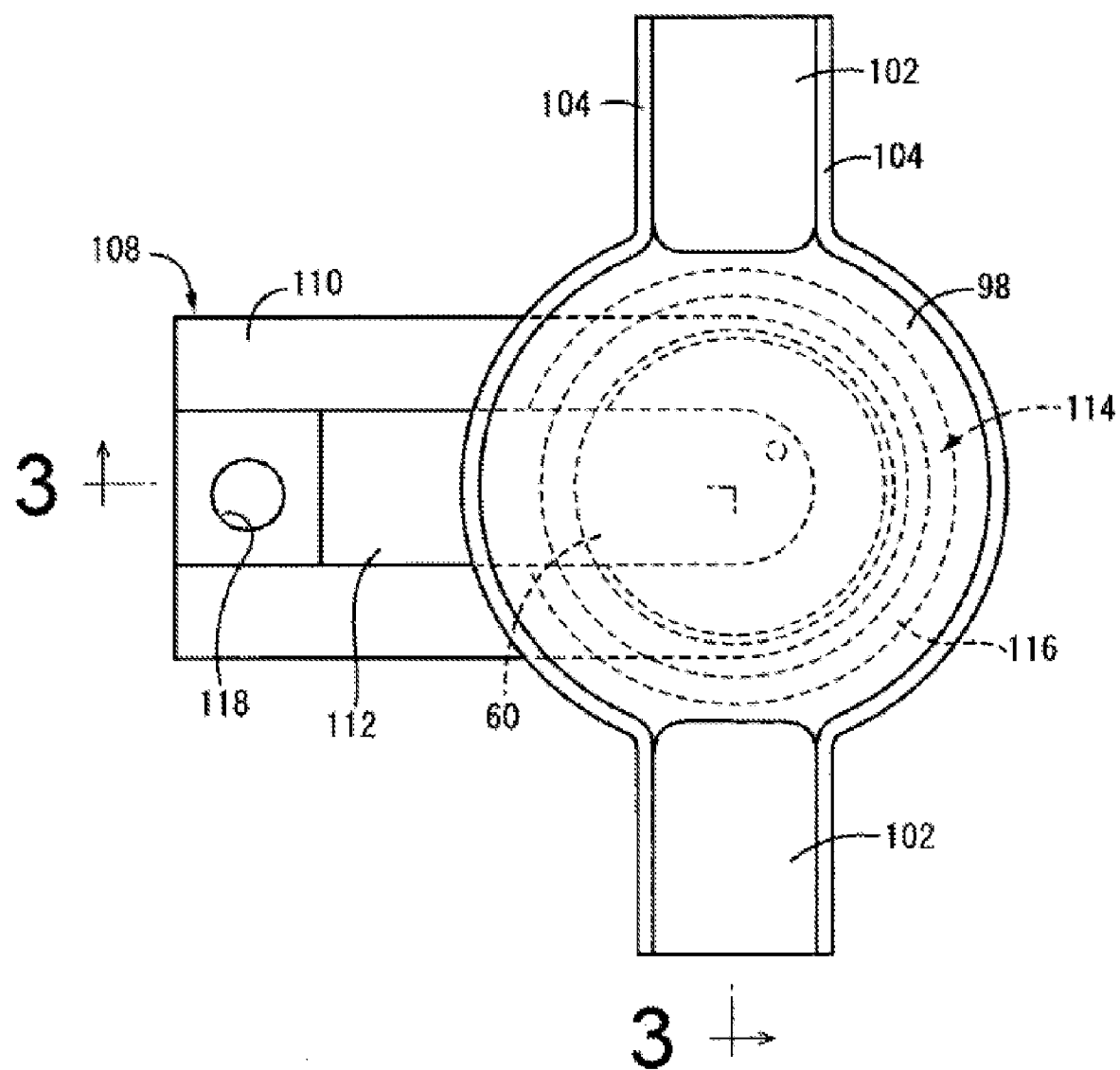
FIG. 4 is a plane view for explaining a positional relationship of a stop member fixed to a body-side bracket relative to a first mounting member in the engine mount of FIG. 3.

The first mounting member 108 is attached to the power unit by means of a bolt (not shown) extending through a bolt hole 118 formed at the first lengthwise end thereof. With the first mounting member 108 is fastened to the power unit in this way, as well as with the second mounting member 14 fastened to the body via the body-side bracket 20, the first mounting member 108 projects in a direction perpendicular to the direction in which the pair of leg portions 86b, 86b are opposed to each other, as shown in FIG. 4.

The abutting face 116 of the first mounting member 108 is superimposed against the abutting face 60 of the rubber elastic body 16, in a substantially concentric fashion, whereby the power unit distributed support load is exerted on the rubber elastic body 16 in the generally axial direction via the abutting face 116 of the first mounting member 108 and the abutting face 60 of the rubber elastic body 16.

The cushion rubber 114, in a portion of the outside peripheral edge of the axial upper end thereof, is placed in slidably contact with the pair of leg portions 100, 100, whereby the spring characteristics of the cushion rubber 114 are adjusted appropriately in the direction in which the pair of leg portions 100, 100 are opposed to each other.

In the engine mount 106 of the construction described above, the first mounting member 108 is not integrally formed with the rubber elastic body 16, and the abutting face 116 of the first mounting member 108 is larger than the abutting face 60 of the rubber elastic body 16. Thus, the engine mount 106 is able to afford advantages analogous to those of the first embodiment.

Figure 5:
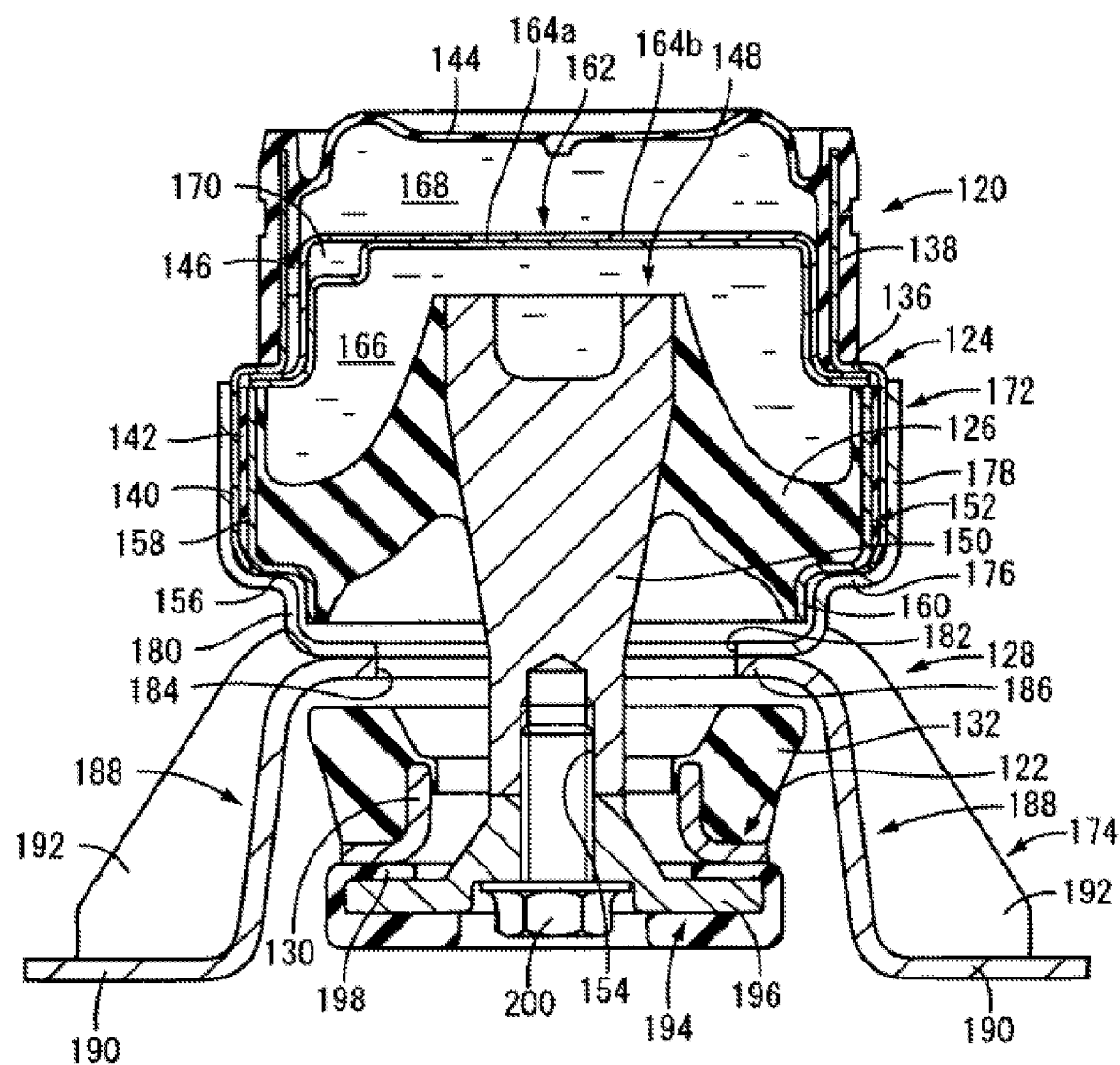
FIG. 5 is an elevational view in axial or vertical cross section of a fluid-filled vibration damping device in the form of an engine mount of construction according to a third embodiment of the invention, which is a view taken along line 5-5 of FIG. 6.
Figure 6:
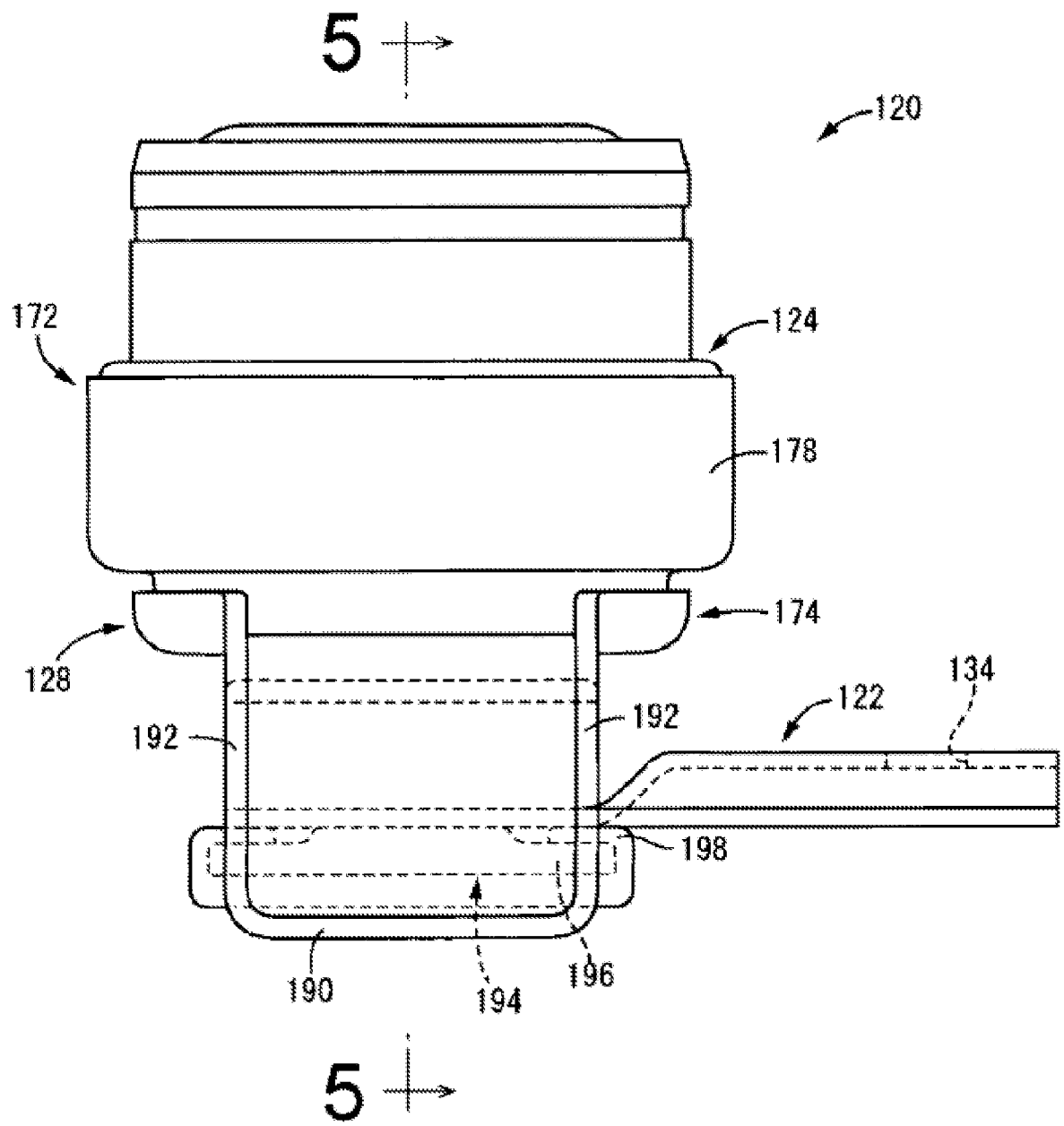
FIG. 6 is a right side elevational view of the engine mount of FIG. 5.

FIGS. 5 and 6 illustrates a fluid-filled vibration-damping device in the form of an automotive engine mount 120 of construction according to a third embodiment of the invention. This engine mount 120 has a construction in which a rubber elastic body 126 is disposed between a metallic first mounting member 122 fixable to the power unit, and a metallic second mounting member 124 fixable to the body. The first mounting member 122 is fixed to the power unit, while the second mounting member 124 is fixed to the body, so that the power unit is superimposed on the body in a vibration-damping manner. With the engine mount 120 of this embodiment installed as stated above, power unit distributed support load is input in the generally vertical direction in FIGS. 5 and 6, and the engine mount 120 exhibits excellent vibration damping effect with respect to input vibration in the generally vertical direction in FIGS. 5 and 6.

Described in detail, the first mounting member 122 has an overall long plate configuration, and includes a cylindrical portion 130 that is formed at a first lengthwise end thereof by means of a burring process so that the cylindrical portion 130 projects toward one side of a thickness-wise direction of the first mounting member 122, i.e., projects upwardly as seen in FIG. 5. A stop rubber in the form of a cushion rubber 114 is bonded through vulcanization of a rubber material for forming thereof to the first lengthwise end of the first mounting member 122 so as to cover an outer circumferential surface of the cylindrical portion 68 formed thereon. This cushion rubber 114 extends with generally uniform cross sectional shape all the way around its circumference, giving it a thick annular block configuration overall. In particular, the cushion rubber 114 has an inside diameter dimension and outside diameter dimension that increase gradually moving upwardly in the axial direction, with the projecting height thereof being greater than the axial length of the cylindrical portion 130. The cushion rubber 114 also extends to an inner circumferential surface of an upper opening of the cylindrical portion 114. The first mounting member 122 of construction mentioned above is fastened to the power unit by means of a bolt (not shown) passed through a bolt passage hole 134 formed in the other lengthwise end thereof (see FIG. 6).

The second mounting member 124, on the other hand, has an overall shape which is a large-diameter cylinder, having a shoulder portion 136 formed in the axially medial portion, with a small-diameter portion 138 situated axially above and a large-diameter portion 140 situated axially below. To the inner circumferential surface of the large-diameter portion 140 is adhered a thin seal rubber layer 142. A diaphragm formed of a rubber film of thin-disk shape is disposed at the open end portion of the small-diameter portion 138. With the outside peripheral edge of the diaphragm 144 is bonded through the vulcanization to the inner circumferential surface of the small-diameter portion 138, the opening of the small-diameter portion 138 is provided with fluid-tight closure by the diaphragm 144. To the inner circumferential surface of the small-diameter portion 138 is adhered a seal rubber 146 integrally formed with the diaphragm 144 in its entirety. The outside peripheral edge of the diaphragm 144 extends to the outer circumferential surface of the small-diameter portion 138.

The first mounting member 122 is situated spaced away from and opposite to the opening on the side of the large-diameter portion 140 of the second mounting member 124, and in between the first and second mounting members 122, 124 is disposed an integral vulcanization molded product 148 which includes the rubber elastic body 126.

This integral vulcanization molded product 148 is composed of an inner fitting 150, an outer fitting 152, and the rubber elastic body 126. The inner fitting 150 has a solid circular rod shape whose outside peripheral face of the axially medial portion is tapered so as to gradually increase in its diameter moving upward in the axial direction, to produce a tapered portion. The inner fitting 150 is formed with a screw hole 154 that opens in its axial bottom face.

The outer fitting 152, on the other hand, has a thin-walled cylindrical shape with an inside diameter dimension sufficiently larger than the outside dimension of the inner fitting 150. A shoulder portion 156 is formed in the axially medial portion, with a large-diameter portion 158 situated axially above and a small-diameter portion 160 situated axially below.

This outer fitting 152 is disposed coaxially about the inner fitting 150 with a given radial spacing therebetween. In this state, the inner fitting 150 is housed within the outer fitting 152, with the upper end thereof projecting up from the axial upper end of the outer fitting 152, and the lower end thereof projecting down from the axial lower end of the outer fitting 152.

With the inner fitting 150 housed within the outer fitting 152 as stated above, the rubber elastic body 126 is interposed between the outer circumferential surface of the inner fitting 150 and the inner circumferential surface of the outer fitting 152. This rubber elastic body 126 has a thick-walled, generally tapering cylinder shape extending tilt from the inner circumferential surface of the outer fitting 152 towards the outer circumferential surface of the inner fitting 150, with the outside peripheral face of the inner fitting 150 being bonded through vulcanization to the inner circumferential surface of its small-diameter portion and the inner circumferential surface of the outer fitting 152 being bonded through vulcanization to the outer circumferential surface of its large-diameter portion. Therefore, the rubber elastic body 126 provides an integral vulcanization molded product 148 comprising the inner fitting 150 and the outer fitting 152. With the rubber elastic body bonded to the inner and outer fittings 150, 152 as stated above, the outer fitting 152 is provided with fluid-tight closure to the opening on the side of the small-diameter portion 160 by means of the rubber elastic body 126 and the inner fitting 150.

The outer fitting 152 of the integral vulcanization molded product 148 is inserted into the large-diameter portion 140 of the second mounting member 124, and the large-diameter portion 140 is then reduced in diameter by a drawing process or the like to secure the outer fitting 152 fitting into the second mounting member 124. By means of this arrangement, the opening on the side of the large-diameter portion 140 of the second mounting member 124 is closed in a fluid-tight manner by the rubber elastic body 126, and a sealed zone is formed inside the second mounting member 124.

A partition member 162 is housed within the small-diameter portion 138 of the second mounting member 124. This partition member 162 is composed of two partition fittings 164a, 164b each of generally inverted cup shape formed by press-forming or the like, and stacked on each other in the axial direction. The partition member 162 is disposed and positioned within the small-diameter portion 138 of the second mounting member with its open end rim gripped by and supported with the open end face of the large-diameter portion 158 of the outer fitting 152 and the shoulder portion 136 of the second mounting member 124.

With the partition member 162 incorporated in the above manner, the fluid-sealing region formed within the second mounting member 124 is partitioned into two sides in the axial direction (the rubber elastic body 126 side and the diaphragm 144 side). With this arrangement, there is formed on the axially lower side of the partition member 162 a pressure receiving chamber 166 a portion of whose wall is constituted by the rubber elastic body 126, so as to undergo change in internal pressure on the basis of elastic deformation of the rubber elastic body 126 during vibration input. On the axially upper side of the partitioning member 162, on the other hand, there is formed an equilibrium chamber 168 a portion of whose wall is constituted by the diaphragm 144, and that readily permits change in volume based on elastic deformation of the diaphragm 144. Within the pressure receiving chamber 166 and equilibrium chamber 168 is respectively sealed a non-compressible fluid such as water, alkylene glycol, polyalkylene glycol, silicone oil and the like.

The partition fittings 164a, 164b of the partition member 96 cooperate to define therebetween a circumferential space located at a peripheral edge portion of its bottom wall portion and extending circumferentially over a given circumferential length. This circumferential space 104 is held in fluid communication at one end thereof with the pressure-receiving chamber 166 through a communication hole (not shown) formed through the partition fittings 164b, and at the other end thereof with the equilibrium chamber 168 through a communication hole (not shown) formed through the partition fittings 164a. The circumferential space of construction stated above thereby provides an orifice passage 170 by which the pressure receiving chamber 166 and the equilibrium chamber 168 are held in fluid communication with each other, thereby permitting fluid to flow between the pressure receiving chamber 166 and the equilibrium chamber 168 through the orifice passage 170. The passage length, sectional area and other parameters of the orifice passage 170 are suitably determined so that effective vibration damping action against low frequency vibration, such as shaking or idling vibration, is exhibited on the basis of resonance or flow action of the fluid caused to flow through the orifice passage 170.

The second mounting member 124 assembled together with the integral vulcanization molded product 148 is then attached to the body via a body-side bracket 128. This body-side bracket 128 is composed of a first fastener member 172 and a second fastener member 174. The first fastener member 172 has the overall shape of a large-diameter, bottomed cylinder having a shoulder portion 176 formed in its axially medial portion, with a large-diameter portion 178 situated axially above and a small-diameter portion 180 situated axially below. A through-hole 182 is formed in the floor of the first fastener member 172.

The second fastener member 174 is of generally gate shape overall, and includes a ceiling plate portion 186 of annular plate configuration having a center hole 184, and a pair of leg portions 188, 188 extending downward in the generally vertical direction from the ceiling plate portion 186, and integrally formed with the ceiling plate portion 186 at respective circumferential portions of the ceiling plate portion 186, which are diametrically opposite to each other. The lower ends of the leg portions 188, 188 bend outwardly in horizontal direction to form fastener plate portions 190, 190. In this embodiment, the diametrical dimension of the center hole 184 is of the same size as the diametrical dimension of the through-hole 182, and the diametrical dimension of the center hole 184 and the through-hole 182 is sufficiently larger than the diametrical dimension of the inner fitting 150. A pair of reinforcing ribs 192, 192 are disposed on the second fastener member 174. The first fastener member 172 and the second fastener member 174 are made of steel or other rigid materials. The lower face of the floor of the first fastener member 172 is attached by means of welding or the like, superimposed coaxially on the upper face of the ceiling plate 186 of the second fastener member 174, thereby constituting the body-side bracket 128.

The large-diameter portion 140 of the second mounting member 124 is secured press-fit into the large-diameter portion 178 of the body-side bracket 128 constructed as stated above. With the second mounting member 124 fixed to the body-side bracket 128 in this way, the lower end of the inner fitting 150 extends through the center hole 184 and the through-hole 182, and projects down below the lower face of the ceiling plate 186. Then, with the second mounting member 124 fixed to the body-side bracket 128, the fastener plate portions 190, 190 of the body-side bracket 128 are superimposed on and bolted to the body, thereby fixing the second mounting member 124 to the body via the body-side bracket 128.

With the second mounting member 124 attached to the body via the body-side bracket 128 as stated above, the cylindrical portion 130 of the first mounting member 122 is externally fitted onto the inner fitting 150, and a stop member 194 is then affixed to the inner fitting 150. This stop member 194 is of frustoconical shape overall, having integrally formed at the large-diameter end thereof a stop portion 196 of annular plate configuration projecting outward in the diametrical direction. To the upper face outside peripheral edge of the stop portion 196 is adhered an abutting rubber 198 of annular configuration. The abutting rubber 198 extends as far as the lower face of the stop portion 196. The stop member 194 is fastened to the inner fitting 150 by means of a bolt 200, with the small-diameter end face superimposed against the lower end face of the inner fitting 150. In this embodiment, the portion of the abutting rubber 198 extending as far as the lower face of the stop portion 196 has a thickness dimension enough to avoid projecting out of the head of the bolt 136 downward in the axial direction.

With the first lengthwise end of the first mounting member 122 positioned on the stop portion 196 secured to the inner fitting 150, the first mounting member 122 is fastened to the power unit, whereby the power unit is supported on the body via the engine mount 120 in a vibration isolating fashion.

According to this embodiment, when the engine mount 120 installed between the power unit and the body, the first lengthwise end of the first mounting member 122 is positioned on the stop portion 196 via the abutting rubber 198, with the cylindrical portion 130 positioned concentrically with the inner fitting 150 as well as with the cushion rubber 132 projecting upward in the axial direction. With this arrangement, the distributed support load of the power unit is input to the rubber elastic body 126 in the generally axial direction.

With the first lengthwise end of the first mounting member 122 positioned on the stop portion 196 via the abutting rubber 198 as stated above, the cushion rubber 132 is positioned concentrically opposite to the ceiling plate 186, with the outside peripheral edge of the axial upper end thereof not abutting the leg portions 188, 188 in a static state where no vibration input.

The portion of the abutting rubber 198 that extends as far as the lower face of the stop member 196 is positioned above the lower faces (mounting faces) of the fastener plate portions 190, 190 of the pair of leg portions 188, 188, thereby permitting elastic deformation of the rubber elastic body 126 in the axial direction.

As is apparent from the preceding description, the cushion rubber 132 and the second fastener member 174, which cooperate to form the body-side bracket, constitute the rebound stop mechanism, in this embodiment. Also, in this embodiment, the fluid chamber is constituted by the pressure receiving chamber 166, equilibrium chamber 168, and orifice passage 170.

In the engine mount 120 of the construction described above, the first mounting member 122 is not integrally formed with the rubber elastic body 126, so that the first mounting member 122 is displaceable away from the stop member 194 in the direction opposite the input direction of the power unit distributed support load (rebound direction). Therefore, in the event that a relatively large load is input in the rebound direction, the engine mount 120 is able to prevent the non-compressible fluid enclosed in the pressure-receiving chamber 166 from acting as a restricting member inhibiting elastic deformation of the rubber elastic body 126, thereby being free from the problem of deterioration in damping performance caused thereby.

Further, since the cushion rubber 132 disposed on the first mounting member 122 is positioned below while being opposite to the ceiling plate 186 in the axial direction, the amount of axial upward displacement of the first mounting member 122 away from the stop portion 196 is limited in a cushion-wise manner.

Still further, since the first mounting member 122 is superimposed on the stop portion 196 with the cylindrical portion 130 thereof passed through the inner fitting 150, an amount of displacement of the first mounting member 122 in the axis-perpendicular direction of the inner fitting 150 is restricted. This arrangement makes it possible to keep the assembled first mounting member 122 positioned over the stop portion 196 while being displaceable away from it.

While the presently preferred embodiments of the invention have been discussed above for the illustrative purpose only, it should be appreciated that the present invention is not limited to the details of the illustrated embodiments.

In the first to third embodiments hereinabove, the invention has been described as being implemented in the engine mounts 10, 106, 120 wherein initial load and vibration are input in the generally axial direction of the second mounting member 14, 124 to the rubber elastic body 16, 126 disposed between the first mounting member 12, 108, 122 and second mounting member 14, 124, by way of example. Alternatively, the invention could instead be implemented in an engine mount wherein initial load and vibration are input in the generally axis-perpendicular direction of the second mounting member, to the rubber elastic body disposed between the first mounting member and second mounting member. Specifically, a mode like that shown in FIGS. 7 and 8 could be employed.

Figure 7:
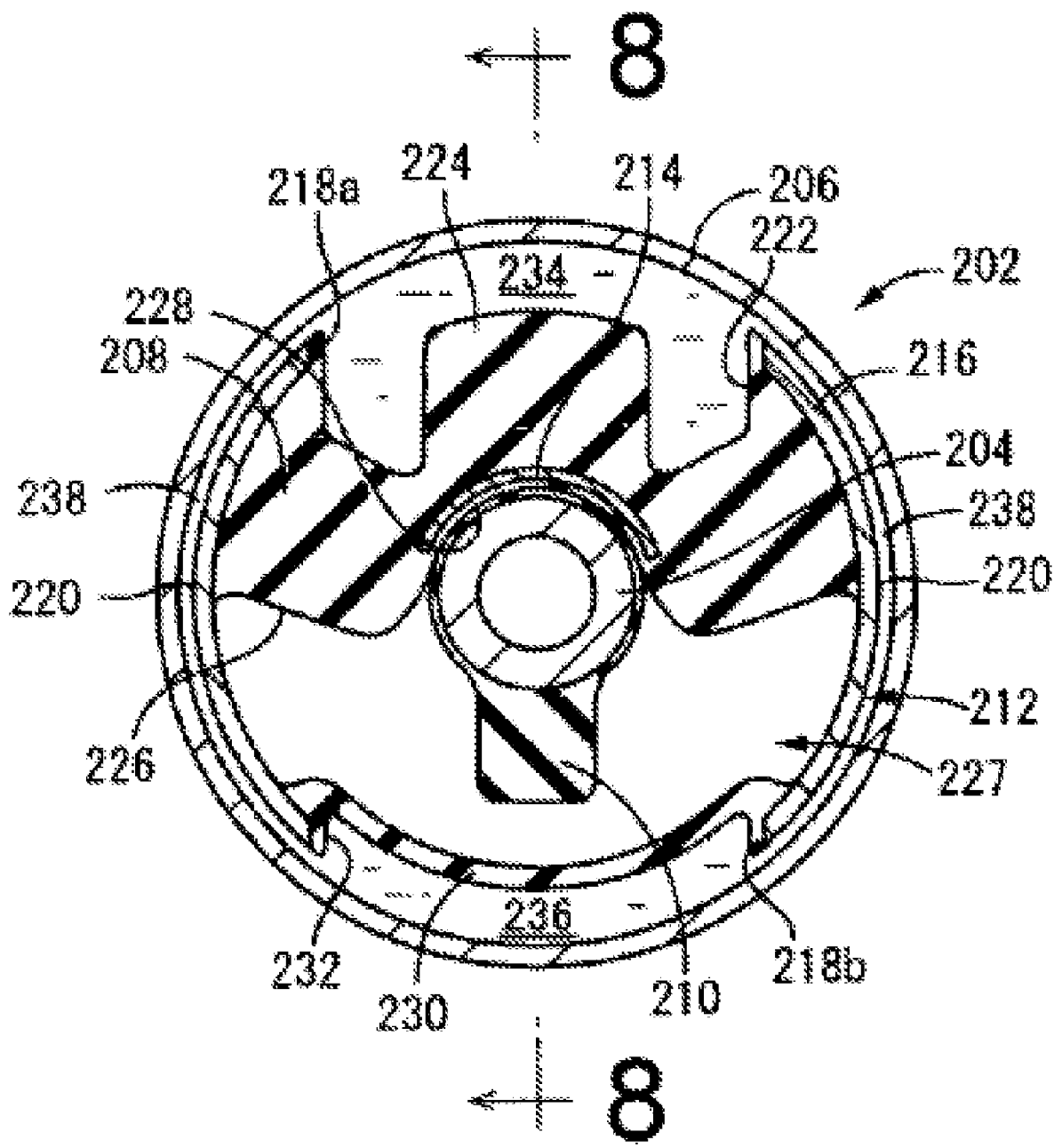
FIG. 7 is an elevational view in axial or vertical cross section of a fluid-filled vibration damping device in the form of an engine mount of construction according to a fourth embodiment of the invention.
Figure 8:
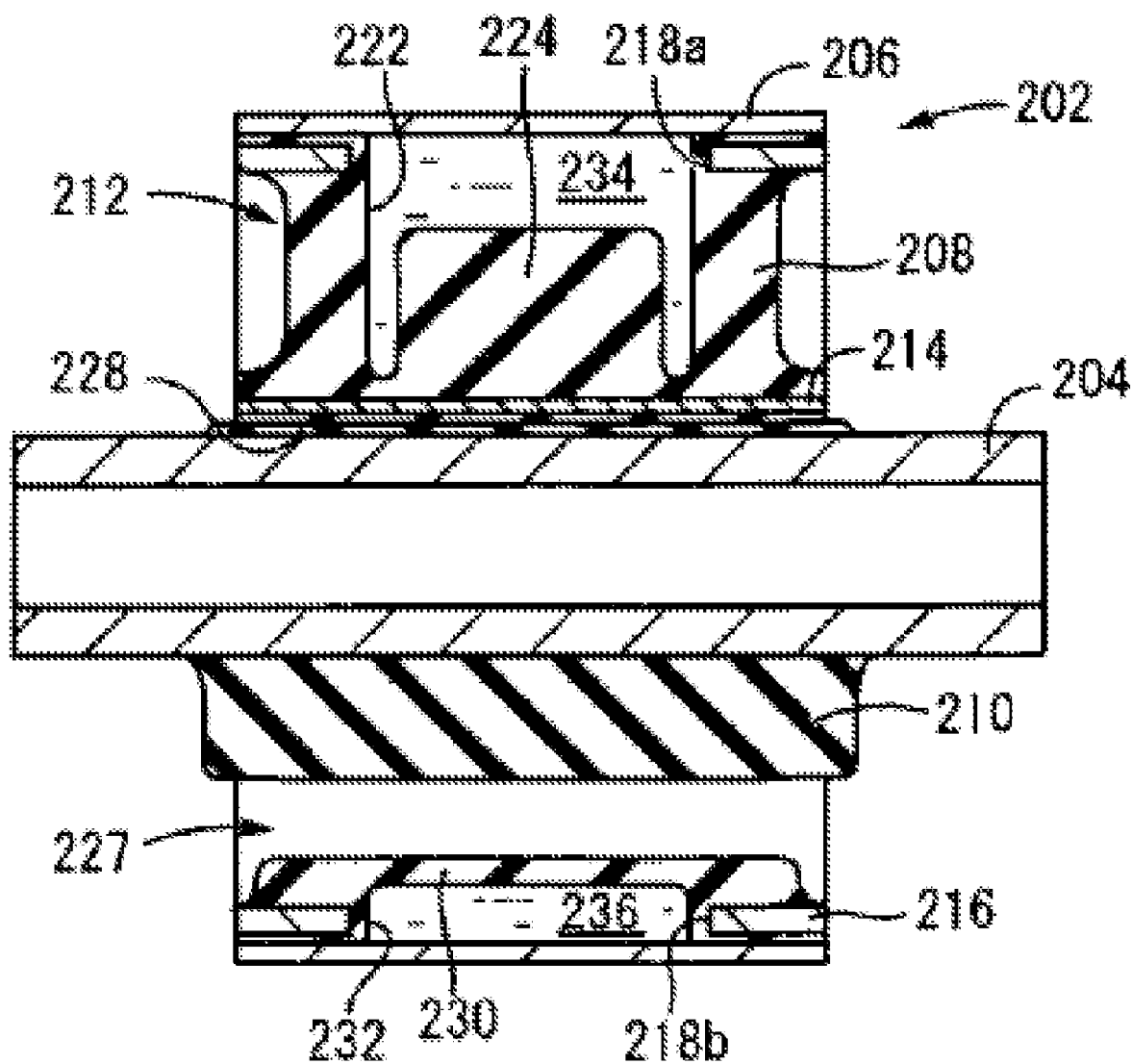
FIG. 8 is a cross sectional view taken along line 8-8 of FIG. 7.

Namely, FIGS. 7 and 8 shows an engine mount 202 of construction according to a fourth embodiment of the invention. This engine mount 202 comprises: a metallic inner sleeve 204 constituting a first mounting member; a metallic outer sleeve 206 constituting a second mounting member; and a rubber elastic body 208 interposed between the inner and outer sleeves 204, 206. The inner sleeve 204 is attached to the body side, while the outer sleeve 206 is attached to the power unit side. In FIGS. 7 and 8, the inner sleeve 204 and outer sleeve 206 are shown positioned generally concentrically, with the distributed support load of the power unit acting in the vertical direction in the drawing.

Described more specifically, the inner sleeve 204 has a thick-walled, small-diameter cylindrical shape, to the outer circumferential surface of which is bonded a cushion rubber 210 as a rebound stop rubber projecting outward in the axis-perpendicular direction, through vulcanization of a rubber material for forming the cushion rubber 210. On the other hand, the outer sleeve 206 has a thin-walled, large-diameter cylindrical shape of an inside diameter dimension that is greater than the outside diameter dimension of the inner sleeve 204. The inner sleeve 204 and the outer sleeve 206 are each made of rigid material such as steel or aluminum alloy. The inner sleeve 204 is arranged passed through the outer sleeve 206, and an integral vulcanization molded product 212 of a rubber elastic body 208 is disposed between the opposing faces of the inner sleeve 204 and the outer sleeve 206.

This integral vulcanization molded product 212 is composed of an abutting support plate 214, a metal sleeve 216, and the rubber elastic body 208. The abutting support plate 214 is formed of rigid material such as steel or aluminum alloy in the form of a rectangular plate extending in the lengthwise direction curves in an arculate configuration across its width. The metal sleeve 216 has a thin-walled, large-diameter cylindrical shape overall, and is provided with symmetrically disposed two windows 218a, 218b (hereinafter referred to as "upper and lower windows 218a, 218b", where appropriate) formed by cutting in rectangular shape, and orifice grooves 220, 220 formed onto its outer circumferential surface so as to connect these two windows 218a, 218b. The abutting support plate 214 is disposed within the metal sleeve 216 with its convex bowed face opposed to one of the two windows, e.g., the upper window 218a formed in the metal sleeve 216. With the abutting support plate 214 arranged passed through the metal sleeve 216 in this way, the abutting support plate 214 and the metal sleeve 216 are bonded to the rubber elastic body 208 upon vulcanizing a rubber material for forming the rubber elastic body 208, thereby forming the integral vulcanization molded product 212 of the rubber elastic body 208 comprising abutting support plate 214 and metal sleeve 216. In particular, the integral vulcanization molded product 212 is formed with the abutting support plate 214 embedded in the rubber elastic body 208. A seal rubber that projects out from the rubber elastic body 208 is formed on the outer circumferential surface of the metal sleeve 216.

The rubber elastic body 208 has a pocket 222 that is situated adjacent to and opens to the outside through the upper window 218a of the metal sleeve 216. Within the pocket 222 is housed a pocket 222 integrally formed with the rubber elastic body 208. The stop rubber 224 projects out by a predetermined height from the abutting support plate 214. The rubber elastic body 208 also has a void 226 that is situated adjacent to the lower window 218b, and axially extends with substantially constant cross section over the entire axial length of the rubber elastic body 208. With this arrangement, there is formed a through hole 227 that extends in the axial direction through the rubber elastic body 208 between the opposing faces of the metal sleeve 216 and rubber elastic body 208. In this embodiment, a portion of a void defining surface of the rubber elastic body 208, has a shape corresponding to the convex curving face of the abutting support plate 214 embedded in the rubber elastic body 208. This portion forms a curved abutting face 228 reinforced by the abutting support plate 214. Thus, the rubber elastic body 208 exhibits shape stability at a location where the inner sleeve 204 is superimposed against the rubber elastic body 208.

The lower window 218b, which is located on the side where the void 226 is formed, is covered by a flexible diaphragm 230 that is provided to the lower window 218b from the inside of the metal sleeve 216. As a result of this arrangement, there is formed a recess 232 that opens to the outside through the window 218b. In this embodiment, the outside peripheral edge of the diaphragm 230, i.e., the portion of the diaphragm that is fixed to the edges of the window 218b, have greater thickness than the portion of the diaphragm 230 that makes up the wall of the recess 232. Thus, the outside peripheral edges of the diaphragm 230 constitute an abutting rubber portion.

The thus constructed metal sleeve 216 of the integral vulcanization molded product 212 is inserted into the outer sleeve 206, and then the outer sleeve 206 is subjected to drawing operation, such as all directional drawing, to decrease its diametric dimension, whereby the metal sleeve 216 is secured press-fit into the outer sleeve 206, and the integral vulcanization molded product 212 is fixedly installed within the outer sleeve 206. By fixing the integral vulcanization molded product 212 to the outer sleeve 206 in this way, the window 281a situated on the side where the pocket 222 is formed is provided with fluid-tight closure by the outer sleeve 206, forming a pressure-receiving chamber 234 whose wall is composed in part by the rubber elastic body 208, while the opening of the recess 232 is provided with fluid-tight closure by the outer sleeve 206, forming an equilibrium chamber 236 a portion of whose wall is constituted by the diaphragm 230. The pressure-receiving chamber 234 and the equilibrium chamber 236 are filled with a non-compressible fluid such as water, alkylene glycol, polyalkylene glycol, silicone oil or the like. Also, the outer sleeve 206 provides fluid-tight closure to openings of the orifice grooves 220, 220, thereby providing orifice passages 238, 283, through which the pressure-receiving chamber 234 and equilibrium chamber 236 communicate with one other, thereby permitting flow of fluid through the orifice passages 238 between the pressure-receiving chamber 234 and the equilibrium chamber 236.

That is, the inner sleeve 204 is disposed extending through the through hole 227, with the cushion rubber 210 disposed thereon projecting towards the diaphragm 230. The thus constructed engine mount 202 is installed on the vehicle with the inner sleeve 204 mounted on the body side, and the outer sleeve 206 mounted on the power unit side, whereby the power unit is supported on the body via the engine mount 202 in a vibration isolating fashion.

With the power unit supported in vibration-isolating fashion on the body as stated above, the curved abutting face 228 partially defining the inner circumferential surface of the through-hole 227 is superimposed on the cylindrical outer circumferential surface of the inner sleeve 204. With the help of this arrangement, the distributed support load of the power unit is exerted on the inner sleeve 204 via the curved abutting face 228, in the direction of projection of the cushion rubber 210.

In this embodiment, even when a relatively large load is input in the direction opposite the input direction of the power unit distributed support load (rebound direction) so that the rubber elastic body 208 undergoes displacement or deformation away from the inner sleeve 204, that is, in which the curved abutting face 288 is no longer superimposed against the cylindrical outer circumferential surface of the inner sleeve 204, the cushion rubber 210 comes into abutment with the rim of the window 218b via the peripheral edges of the diaphragm 230 (abutting rubber portion), thereby restricting in a cushion-wise manner the amount of displacement of the rubber elastic body 208 and the outer sleeve 206 in the rebound direction.

As is understood from the preceding description, the rebound stop mechanism is constituted by the cushion rubber 210 and the metal sleeve 216, and the fluid chamber is constituted by the equilibrium chamber 236 and the orifice passage 238, in this embodiment.

In the engine mount 202 of construction described above, since the inner sleeve 204 is constituted as a separate element from the rubber elastic body 208, advantages analogous to those of the first embodiment are afforded.

In the first embodiment hereinabove, the abutting face 60 of the rubber elastic body 16 is a flat surface. However, the abutting face is not limited to a flat surface, and may consist of a surface such as that depicted in FIG. 9. To facilitate understanding, in the description hereinbelow, components and parts similar in structure to those in the first embodiment are assigned the same numerals used in the first embodiment.

Described in detail, a first mounting member 240 has a generally inverted frustoconical shape, having integrally formed at its large-diameter end portion a fastener portion 242 for fastening the first mounting member 240 to the power unit-side bracket 18. A cushion rubber 224 is adhered to the outside peripheral edge of the large-diameter end portion of the first mounting member 240. To the small-diameter end portion of rubber elastic body 16, on the other hand, there is bonded through vulcanization a bowl-shaped support member 245. The structure of this support member 245 includes a bottom wall portion 246 of disk shape and a tapered wall portion 247 that gradually increases in diameter moving axially upward, and integrally formed on the outside peripheral edge of the bottom wall portion 246. The small-diameter end portion of the rubber elastic body 16 is bonded through vulcanization to the lower face of the bottom wall portion 246 and the outer circumferential surface of the tapered wall portion 247 of the support member 245. The rubber elastic body 16 extends up to the inner circumferential surface of the tapered wall portion 247 and the upper face of the bottom wall portion 246, thereby forming on the inner circumferential surface of the tapered wall portion 247 of the support member 245 a tapered abutting face 248 that is composed of the extending portion of the rubber elastic body 16, and that gradually decreases in diameter moving axially downward, as well as forming on the upper face of the bottom wall portion 246 of the support member 245 a flat bottom side abutting face 249 composed of the extending portion of the rubber elastic body 16.

The first mounting member 240 is fixed to the power unit side via the power unit-side bracket 18, and the second mounting member 14 bonded with the rubber elastic body 16 is fixed to the body via the body-side bracket 20. In this state, the first mounting member 240 is positioned in abutment with the rubber elastic body 16, with the small-diameter end portion thereof superimposed against the bottom side abutting face 249 and the tapered outside peripheral face thereof superimposed against the tapered abutting face 248, respectively. That is, in the mode shown in FIG. 9, the first mounting member 240 is positioned in abutment against the rubber elastic body 16, accommodated within a recess 250 having the tapered abutting face 248 and the bottom side abutting face 249. With the first mounting member 240 is positioned in abutment against the rubber elastic body 16 as stated above, the first mounting member 240, the rubber elastic body 16 and the second mounting member 14 are disposed mutually concentrically, whereby the distributed support load of the power unit is exerted in the generally axial direction on the rubber elastic body 16.

Figure 9:
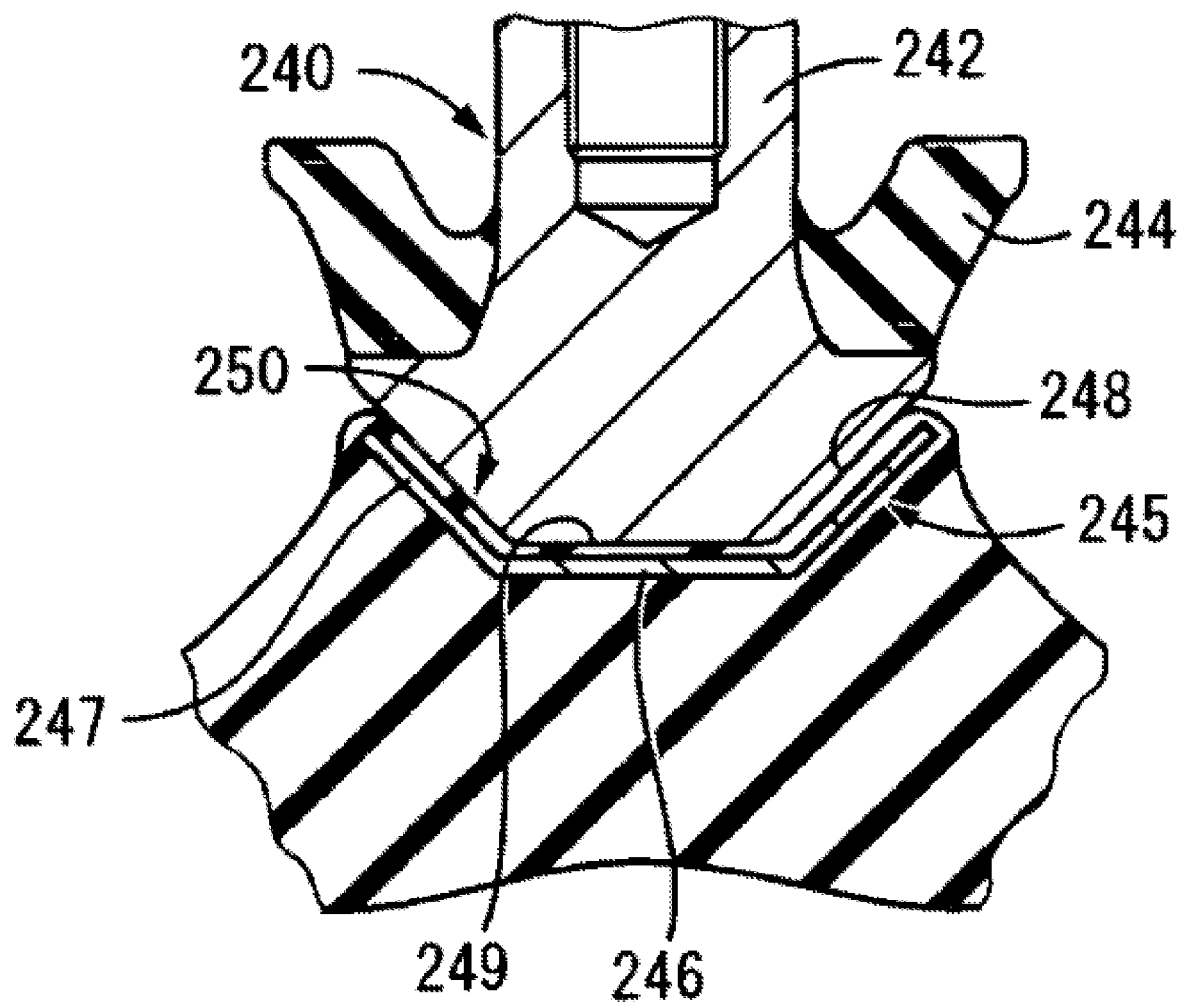
FIG. 9 a vertical cross sectional view showing another arrangement of an abutting face of the rubber elastic body side in the engine mount of FIG. 1.

In the mode shown in FIG. 9, when the first mounting member 240 undergoes displacement away from the rubber elastic body 16, even if the center axis thereof should deviate from the center axis of the rubber elastic body 16 and the second mounting member 14, the first mounting member 240 will be repositioned in abutment with rubber elastic body 16 in a state of being accommodated within the recess 250, as a result of the outside peripheral edge of the small-diameter end of the first mounting member 240 being guided axially downward through sliding contact with the tapered abutting face 248. By means of this arrangement, the distributed support load of the power unit can be consistently exerted in the generally axial direction on the rubber elastic body 16.

In the first and second embodiments described hereinabove, the support plate 58 is bonded through vulcanization to a portion of the rubber elastic body 16 positioned in abutment with the first mounting member 12. However, the support plate 58 is not necessarily needed to practice the invention. In the first embodiment, the rubber elastic body 16 extends as far as the upper face of the support plate 58, that is, as far as the face of support plate 58 that carries the first mounting member 12. However, the rubber elastic body 16 is not necessarily extend as far as the face of support plate 58 that carries the first mounting member 12.

In the first to third embodiments hereinabove, the cushion rubbers 28, 114, 132 are disposed on the first mounting members 12, 108, 122, respectively. However, in the first and second embodiments the cushion rubbers 28, 114 could instead be provided on the stop member 94 positioned in opposition in the axial direction to the first mounting member 12, 108, or in the third embodiment, on the second fastener member 174, for example.

In the first and second embodiments, the stop member 94 which makes up part of the rebound stop mechanism is stationary disposed on the body-side bracket 20. However, the stop member 94 could instead be stationary disposed on the body, for example.

In the first to fourth embodiments hereinabove, the first mounting member is displaceable away from the rubber elastic body. However, an arrangement wherein the second mounting member is displaceable away from the rubber elastic body could be employed, instead. Alternatively, an arrangement wherein both the first and second mounting members are displaceable away from the rubber elastic body could be employed.

While there were shown specific examples of implementing the invention in an automobile engine mount in the illustrated embodiments, the invention could of course be implemented analogously in a body mount, a cab mount, or other mounts for automobiles or other apparatuses.

It is also to be understood that the present invention may be embodied with various other changes, modifications and improvements, which may occur to those skilled in the art, without departing from the spirit and scope of the invention defined in the following claims.

What is claimed is:

1. A fluid filled vibration damping device comprising:
   a first mounting member;
   a second mounting member;
   a rubber elastic body disposed between the first and second mounting members; and
   a fluid chamber whose wall is partially defined by the rubber elastic body, and having a non-compressible fluid sealed therein,
   wherein initial load and vibration are caused to act on the rubber elastic body by means of the first and second mounting member, so as to produce vibration damping action on the basis of flow action of the non-compressible fluid created within the fluid chamber during vibration input, and wherein the first mounting member is independent of and separable from the rubber elastic body and is disposed in abutment with the rubber elastic body in an initial load acting direction, while the first mounting member is displaceable away from the rubber elastic body in an opposite direction from the initial load acting direction, and a rebound stop mechanism disposed between the first mounting member and the second mounting member to provide a cushion that limits an amount of displacement of the first mounting member away from the rubber elastic body, whereby tensile deformation of the rubber elastic body in the opposite direction from the initial load acting direction may be avoided.

2. A fluid-filled vibration damping device according to claim 1, wherein the second mounting member is fixed to the rubber elastic body, and the rebound stop mechanism includes a rebound stop rubber being fixed to the first mounting member.

3. A fluid-filled vibration damping device according to claim 1, wherein an abutting face of the rubber elastic body against the first mounting member is reinforced by a support plate embedded therein.

* * * * *